D. MacTAVISH.
AUTOMOBILE LOCK.
APPLICATION FILED APR. 14, 1920.
1,366,697.
Patented Jan. 25, 1921.
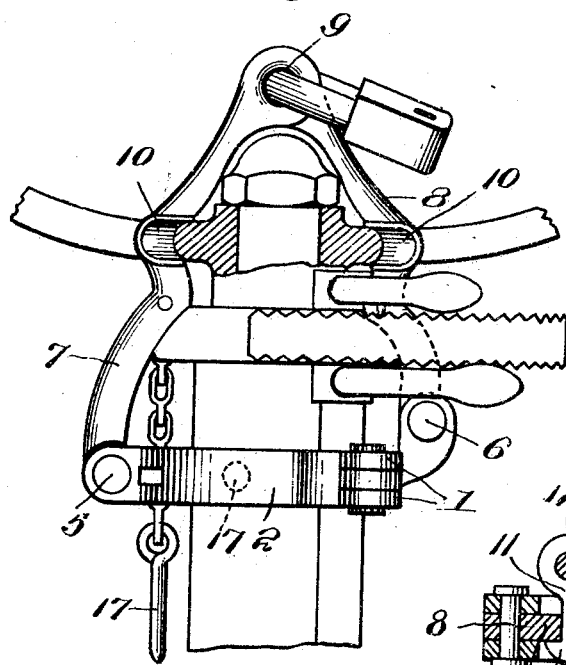
Fig. 1.
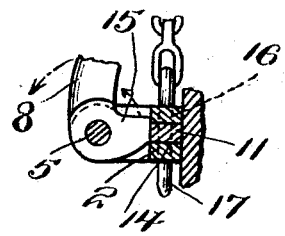
Fig. 4.
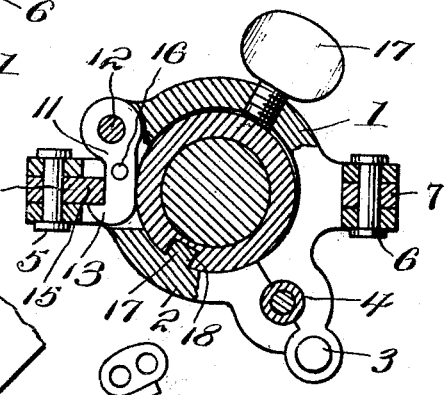
Fig. 3.
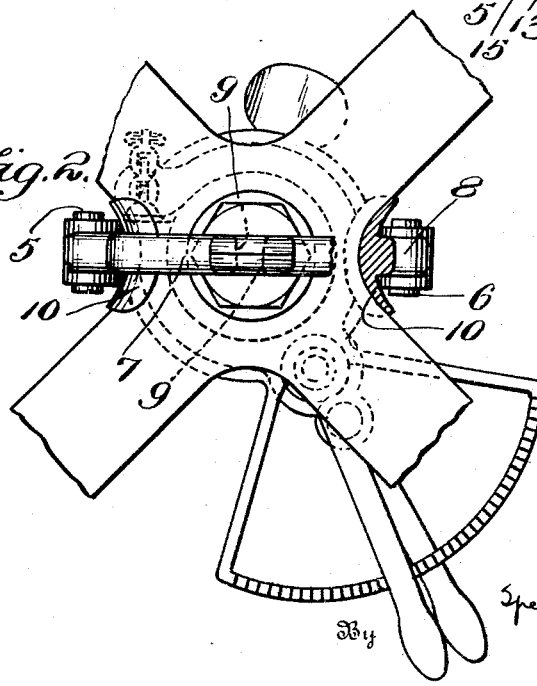
Fig. 2.
Fig. 5.
Inventor
Duncan MacTavish.
Spear, Middleton, Donaldson
and Hall
Attorneys
By

UNITED STATES PATENT OFFICE.

DUNCAN MacTAVISH, OF MARTINSBURG, WEST VIRGINIA.

AUTOMOBILE-LOCK.

1,366,697.　　　　　Specification of Letters Patent.　　Patented Jan. 25, 1921.

Application filed April 14, 1920. Serial No. 373,896.

*To all whom it may concern:*

Be it known that I, DUNCAN MACTAVISH, a citizen of the United States, and a resident of Martinsburg, in the county of Berkeley and State of West Virginia, have invented certain new and useful Improvements in Automobile-Locks, of which the following is a specification.

This invention relates to automobile locks, of the type applied to the steering wheel.

The object of my invention is to provide means whereby the front wheels of an automobile may be locked in such a position as to preclude the possibility of any unauthorized person operating the automobile.

A further object of my invention is to provide a lock of the above type of simple construction, strong, durable and of low cost to manufacture, and consists of the novel features more fully pointed out in the annexed specification and appended claims.

In the drawings forming a part of this specification, like reference characters refer to like parts throughout the several views of which Figure 1 is a side elevation of one form of my device applied to the steering wheel of a popular make of automobile.

Fig. 2 is a top plan view of same partly in section.

Fig. 3 is a longitudinal sectional view of the collar member and associated parts.

Fig. 4 is a view partly in section and partly in elevation of the temporary locking pin in operative position.

Fig. 5 shows a modification of the device in which the upper ends of the arms compose a self-contained lock.

Referring now to the drawing, my improved form of automobile lock consists of members 1 and 2 encircling the steering post, and pivoted at 3. A recess is provided as at 4 to embrace the vertical portions of the spark and gas levers. Pivoted to members 1 and 2 at 5 and 6 are the arms 7 and 8, adapted to be drawn up between the spokes of the steering wheel and a padlock passed through alining apertures 9 or provided with other means of locking the upper ends.

These arms 7 and 8 are provided with grooved ears 10 formed to tightly fit two diagonally disposed crotches between the spokes.

Member 1 is provided with a tongue 11 pivoted at 12, having a lug 13 and designed to fit into longitudinal recess 14 in member 2. Arm 8 has at its pivot end a substantially right angle lug 15, which when arm 8 is in its vertical or locked position, engages with lug 13 to prevent separation of members 1 and 2. A hole may be drilled through member 2 and tongue 11 as at 16 to receive a pin 17 which prevents the separation of members 1 and 2 when member 8 is temporarily unlocked. Or if it is desired to permanently attach the device to the steering post, a rivet may be passed through hole 16.

Set screw 17 allows the device to be positioned on the steering post in any convenient place when not in use.

Recess 4 provides means whereby it is impossible to rotate the device about the steering post when in the locked position. Obviously members 1 and 2 may be made to conform to other shapes of steering posts. In the absence of an irregular post or the levers positioned at the side thereof, I provide member 2 with an integral pin projecting radially, shown at 17, which when socketed in hole 18 in the steering post prevents rotation of the device.

The drawings show one form of my improved locking device adapted for use on a popular make of automobile, but I do not wish to be restricted to the exact form shown, as obviously various modifications of the device may be made.

What I claim as new and desire to secure by Letters Patent is:

1. A lock of the class described comprising a hinged collar adapted to encircle a steering post, provided with means to lock its free ends including a pivoted tongue, arms pivoted to said collar at diametrically opposed points to embrace the hub of a steering wheel and adapted to have their upper ends locked.

2. In combination with a steering wheel, an encircling member, arms pivoted thereto embracing the hub of the steering wheel, and coacting means between the encircling member and one arm to prevent separation of the encircling member when the hub embracing arms are in the locked position.

3. As an article of manufacture, a lock of the class described, a collar composed of two substantially semi-circular hinged members, arms pivoted thereto, coacting means between one arm and one of the hinged members to lock the free ends of the collar when the arm is raised.

4. A lock of the class described comprising a hinged collar adapted to encircle a steering post provided with means to lock its free ends, arms pivoted to said collar at diametrically opposed points to embrace the hub of a steering wheel and adapted to have their upper ends locked, said arms being provided with means fitting a crotch of the steering wheel to insure rigidity of the device.

5. The device of claim 3, said locking means including a tongue pivoted to one of said hinged members and engaging a lug upon one of said arms.

In testimony whereof, I affix my signature.

DUNCAN MacTAVISH.